June 19, 1934.                O. H. TRUMAN                1,963,252
                         OPTICAL TORSION BALANCE
                         Filed Sept. 30, 1929            2 Sheets-Sheet 1

INVENTOR
Orley H. Truman
BY
ATTORNEY

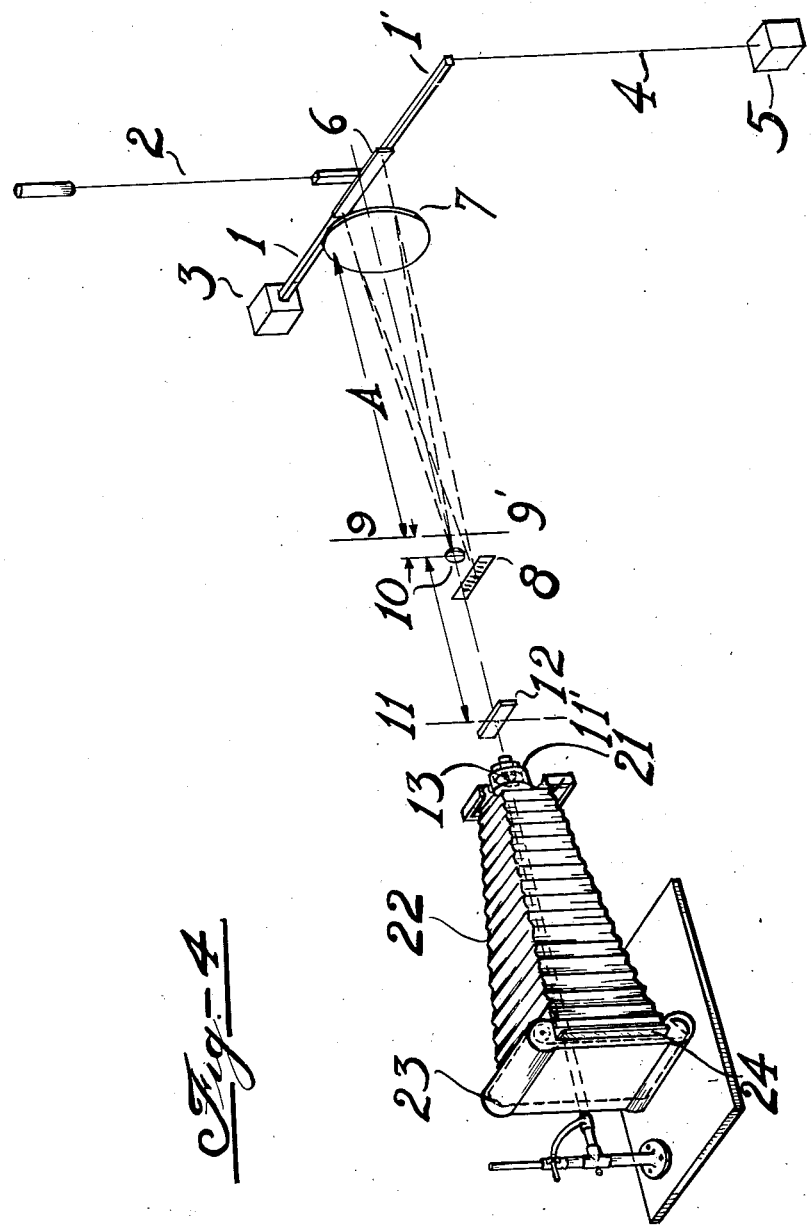

Patented June 19, 1934

1,963,252

UNITED STATES PATENT OFFICE 1,963,252

OPTICAL TORSION BALANCE

Orley H. Truman, Houston, Tex., assignor to Standard Oil Development Company

Application September 30, 1929, Serial No. 396,200

2 Claims. (Cl. 88—14)

This invention is an improvement upon previous forms of the Eotvos torsion balance, widely used in commercial geophysical exploration. A principal object of the invention is to secure much more rapid indications than has heretofore been possible. In a preferred form of the invention this is accomplished by a special arrangement of lenses forming the equivalent of a compound microscope, together with means for observing or recording variations due to movements of the torsion balance.

The invention will be fully understood from the following description read in connection with the accompanying drawings in which Fig. 1 is a diagrammatic view, in perspective, of a preferred form of the invention.

Fig. 4 is a diagrammatic view in perspective of a form of the invention in which photographic recording means are provided for.

It can be easily shown, in the theory of the torsion balance, that the angular sensitivity—i. e., the angle through which the beam of the balance is deflected by any gravity gradient, say a unit gradient, depends chiefly upon the period, and varies directly with the square of the period. It can be changed somewhat for better or worse by variation of the proportions of the balance, but within practical limitations this change is small, so that the period is by far the most important factor.

Previous means of reading the above angular deflection have been capable of only a very moderate degree of accuracy. In order, therefore, to make it possible to detect small gradients of gravity, it has been necessary to make the angular sensitivity high. This has necessitated making the period from 20 to 25 minutes. The time which must be allowed for readings is roughly twice the period, which makes it from 40 minutes to fifty minutes; and, as the least possible number of readings at a station is 3, even with a balance having 2 beams, and as more readings are customarily taken, the time spent at a station usually amounts to at least 4 hours.

This excessive length of time required for readings is not only a direct disadvantage, but an indirect disadvantage as well, in that the large changes of temperature due to the period of the day, become effective. This adversely affects the operation of the balance, and requires elaborate protective coverings on the balance itself, and a portable house to contain it, in order to reduce temperature effects.

In accordance with the present invention, the angular accuracy of the reading is improved and the period of the instrument is correspondingly reduced.

It is clear that if the angular accuracy of reading could be improved 25 fold, it would enable the period to be reduced 5 fold, and similarly for other values, so that a great improvement in avoidance of the above drawbacks will result.

Figure 1:
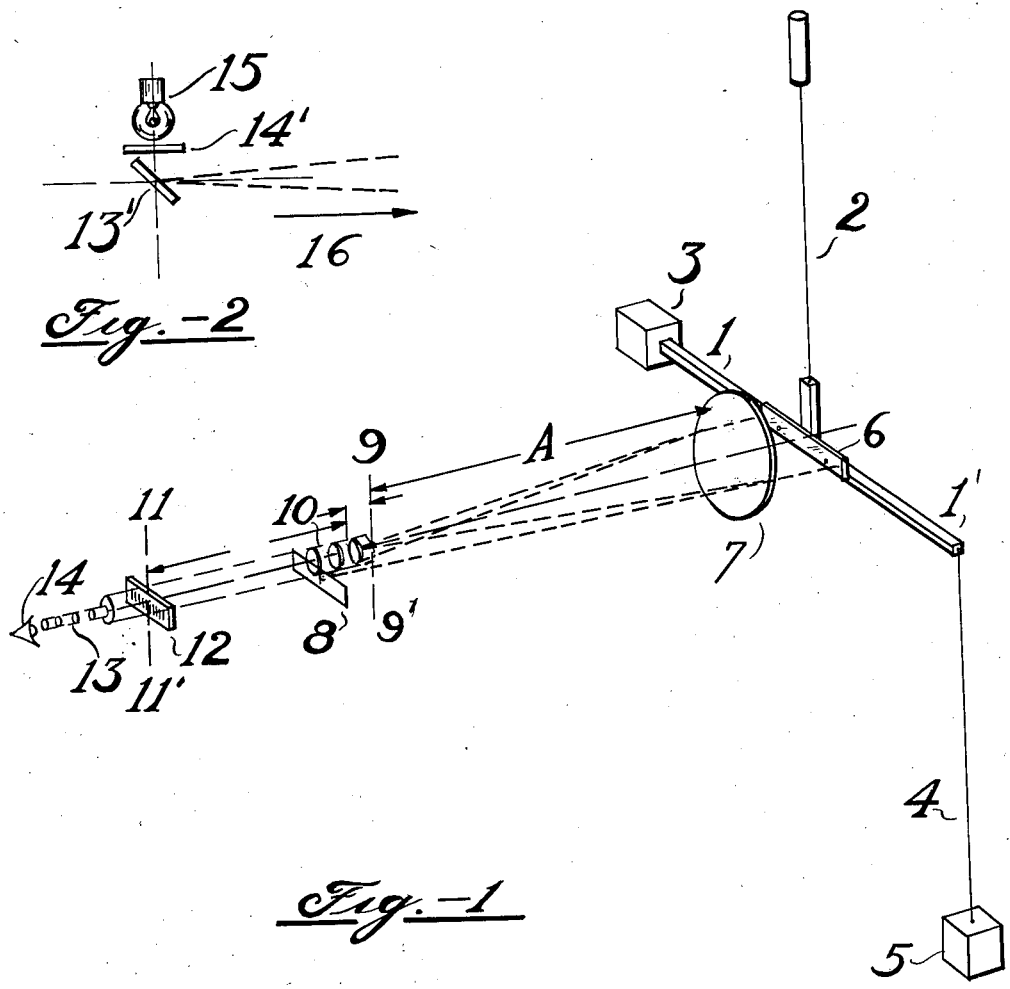

In Fig. 1, 1—1' is the beam of a torsion balance, suspended from a torsion wire 2, and having attached to one end the mass 3. A mass 5 is suspended from the other end of the balance by the wire 4. All this is as customary. To the beam is attached a mirror 6, again as customary, save that in my balance the mirror will preferably be made elongated considerably as shown, instead of being round, as previously. The housing of the instrument is not shown for simplification.

In front of mirror 6 and near to it is placed a lens 7. In front of the lens and at a suitable distance, from it, approximately equal to its focal length, is placed a marker or image-former 8 which will be further described below. Light from this marker passes through lens 7 to a mirror 6 and is reflected back through the lens, forming a real image of marker 8 in plane 9—9'. The light continues on through a lens 10, which forms a second image in plane 11—11', coinciding with a scale 12. Image and scale are magnified by an eyepiece 13, and viewed by the eye at 14.

The lens 10 is in practice not one lens alone but a microscope objective, composed of a combination of lenses as shown in Fig. 1. Eyepiece 13 is a combination of lenses also, as used for microscope eyepieces as shown in Fig. 1. Lenses 10 and 13 and scale 12 may be considered the equivalent of a compound microscope with objective, eyepiece and eyepiece micrometer. Use of the compound microscope in the manner described gives a high degree of sensitivity.

With a compound microscope of very ordinary quality it is possible to measure deflections of the primary image in plane 9—9' to 0.005 mm. or less. If the distance from plane 9—9' to lens 7 is 500 mm., this would mean a deflection of the light beam of about 2 seconds of angle, and of the torsion balance beam of about one second—a greatly improved accuracy over that mentioned above as holding good with old forms of torsion balance. This will bring with it the advantage above explained.

The marker 8 may be made in a variety of ways, the essential of any of them being to provide a very small and sharp object. It may be a plate having a narrow slit, through which light shines from behind. In that case, the scale 12 will have to be illuminated by any of the means commonly used in such cases, in order to make it visible.

Figure 2:
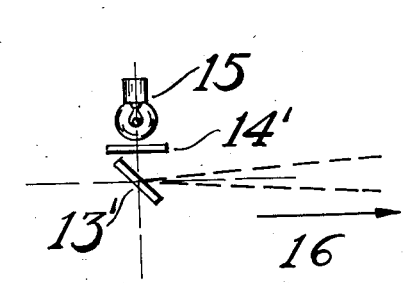
Fig. 2 is a detailed view of one form of marker or image forming device as shown in Fig. 1.

A very desirable arrangement for a marker which requires no special illumination of scale 12, is shown in Fig. 2. Here 13' is a mirror of silvered glass, set at an angle as shown, and reflecting light from a small lamp 15, and a diffuser of ground glass or similar material, 14', in the direction of arrow 16, toward the lens 7 as shown in Fig. 1. On the silvering of the mirror, perpendicular to the plane of the paper, is a very fine scratch. This will appear as a dark line, through the eyepiece 13.

A great many variations upon the above arrangement will suggest themselves to those skilled in the art and are included within the appended claims. For example, plane mirror 6 and convergent lens 7 can be replaced by a single concave mirror at 6, though I consider that this would not usually be of practical advantage. Microscope objective 10, of the usual type, can be replaced by a divergent lens, and so on.

Another variation would be to replace the eye at 14 by a photographic plate, placed some distance farther away, which, with proper focus would then have formed upon it an image of marker 8, which would move to and fro with the deflections of the balance beam 1—1'. In that case, the scale 12 could either be retained, and allowed to photograph itself upon the plate as a datum of reference, or it can be dispensed with, in which case a fixed line on the plate itself would serve as a datum.

In Fig. 4 the fixed marker 8 consists of a fixed scale. The photographic recording means comprises a light tight collar 21, light tight bellows 22, photographic film spool supports 23 and photographic film 24.

Also, in photography, it will at times be possible to omit lens 13, and put the plate in place of scale 12. This plate will then receive and photograph an image either of marker 8 or of a scale put in the position of marker 8, as the case may be. Heretofore the photographic plate has been put in the plane 9—9', lenses 10 and 13 being dispensed with. It will be observed that even with lens 10 alone, as just described above, I can get an improvement in sensitivity equal to the magnifying power of that lens, which may easily reach 30 fold or more.

But I consider that the preferable arrangement will be as shown in Fig. 1, with eye observation, and a marker like Fig. 2.

Figure 3:
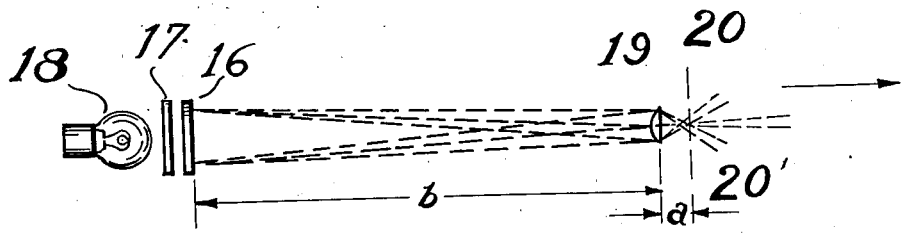
Fig. 3 is a detailed view of an alternative arrangement to replace marker 8 of Fig. 1.

Also, scale 12 can be replaced by a single reference line, and marker 8 by a scale. In that case, however, the scale would have to be very small. A better arrangement accomplishing the same purpose is shown in Fig. 3.

In that figure, 16 is a transparent scale, illuminated by a diffuser 17 and lamp 18. By means of a lens or a combination of lenses 19, such as a microscope objective, an image of this scale, greatly reduced in the ratio of distance $a$ to distance $b$, is formed in plane 20—20'. This small image of a scale will then take the place of a scale itself, and will avoid requiring the latter to be of prohibitively minute size.

In the following claims the marker 8 of Figure 1, its modifications, or the devices shown in Figures 2 and 3 will be called by the generic name "fixed marker," while scale 12 or its modifications such as cross thread or the micro-meter of a compound microscope, a scale or a single reference line on a photographic plate, etc., will be designated as "axis of reference."

A balance embodying the above features will not usually be built with only one beam, as here shown for the sake of simplicity, but with two beams, either set at 180 degrees to each other, as in common practice, or at 90 degrees to each other, as has occasionally been done. If two beams are used, they can be arranged so that the same microscope and large lens 7 can be used to read them both, either at the same time or in alternation. This invention is applicable to any number of beams, arranged in any way.

It will be understood, too, that the beam need not be made as here shown, but may be of any other form. The widely used Z-shaped beam, for example, may be employed.

Various changes and alternative arrangements may be made within the scope of the appended claims, in which it is my intention to claim all novelty inherent in the invention.

I claim:

1. In combination, a short period torsion balance including a torsion wire and a weighted bar suspended by the wire and having a short period, a mirror movable with the bar, a source of light a compound microscope, and an optical system directing radiant energy from the source to the mirror and directing light reflected from the mirror upon the microscope throughout the period of the bar.

2. The combination as set forth in claim 1, in which the bar has a period of approximately five minutes.

ORLEY H. TRUMAN.